(12) United States Patent
Jiang et al.

(10) Patent No.: US 10,580,383 B2
(45) Date of Patent: *Mar. 3, 2020

(54) VIRTUAL REALITY GLASSES

(71) Applicant: BEIJING XIAOMI MOBILE SOFTWARE CO., LTD., Beijing (CN)

(72) Inventors: Hao Jiang, Beijing (CN); Shun Wang, Beijing (CN); Wenhui Ding, Beijing (CN); Huiming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,858

(22) Filed: May 15, 2018

(65) Prior Publication Data
US 2019/0027115 A1    Jan. 24, 2019

(30) Foreign Application Priority Data
Jul. 19, 2017    (CN) .......................... 2017 1 0591296

(51) Int. Cl.
*G09G 5/00* (2006.01)
*G02B 27/01* (2006.01)
(Continued)

(52) U.S. Cl.
CPC ......... *G09G 5/006* (2013.01); *G02B 27/0176* (2013.01); *G06F 3/147* (2013.01);
(Continued)

(58) Field of Classification Search
USPC ........................................................... 345/8
See application file for complete search history.

(56) References Cited

U.S. PATENT DOCUMENTS

2007/0248238 A1* 10/2007 Abreu ................... G02C 3/003
                                                              381/381
2010/0079356 A1*  4/2010 Hoellwarth .......... G02B 27/017
                                                                345/8
(Continued)

FOREIGN PATENT DOCUMENTS

CN    1815437 A    8/2006
CN  104849864 A    8/2015
(Continued)

OTHER PUBLICATIONS

International Search Report dated Apr. 17, 2018 for corresponding PCT/CN2017/112879, 5 pages.
(Continued)

*Primary Examiner* — Chineyere D Wills-Burns
(74) *Attorney, Agent, or Firm* — Arch & Lake LLP

(57) ABSTRACT

Virtual reality glasses are provided, which may include: a glasses body that can be assembled with an external electronic device that plays virtual reality content; and a data connection line. The data connection line includes a first connection plug at a first end, the first connection plug being engaged with a first interface on the glasses body to detachably connect the data connection line with the glasses body. The data connection line also includes a second connection plug at a second end, the second connection plug being adapted to a second interface of the external electronic device. The virtual reality glasses and the data connection line in the present disclosure are detachably connected such that the data connection line can be separated from the glasses body of the virtual reality glasses, improving the versatility of virtual reality glasses.

25 Claims, 14 Drawing Sheets

(51) Int. Cl.
    *G06F 3/147*     (2006.01)
    *H04B 1/3827*     (2015.01)
    *H04B 1/3877*     (2015.01)
    *G06F 1/16*     (2006.01)
    *G06T 19/00*     (2011.01)
    *G02B 27/22*     (2018.01)

(52) U.S. Cl.
    CPC ........... *H04B 1/385* (2013.01); *H04B 1/3877* (2013.01); *G02B 2027/0156* (2013.01); *G02B 2027/0169* (2013.01); *G06F 1/163* (2013.01); *G06F 1/1632* (2013.01)

(56) References Cited

U.S. PATENT DOCUMENTS

| | | | |
|---|---|---|---|
| 2014/0146243 | A1* | 5/2014 | Liu ................. G02B 27/017 348/838 |
| 2015/0138645 | A1* | 5/2015 | Yoo ................. G02B 27/0101 359/630 |
| 2015/0234189 | A1* | 8/2015 | Lyons ............... G02B 27/017 345/174 |
| 2015/0348327 | A1 | 12/2015 | Zalewski |
| 2016/0062125 | A1* | 3/2016 | Baek ............... G02B 27/0176 361/679.01 |
| 2016/0209658 | A1 | 7/2016 | Zalewski |
| 2016/0267712 | A1* | 9/2016 | Nartker ............... G06F 3/012 |
| 2017/0094816 | A1 | 3/2017 | Yun |
| 2017/0115839 | A1 | 4/2017 | Park et al. |
| 2017/0153672 | A1* | 6/2017 | Shin ............... G02B 27/0176 |
| 2017/0318281 | A1* | 11/2017 | Edlund ............. G02B 27/0172 |
| 2018/0348812 | A1* | 12/2018 | Miller ................ G06F 1/163 |
| 2019/0027879 | A1* | 1/2019 | Jiang ............... G02B 27/0176 |

FOREIGN PATENT DOCUMENTS

| | | |
|---|---|---|
| CN | 105223692 A | 1/2016 |
| CN | 205643859 U | 10/2016 |
| CN | 106154555 A | 11/2016 |
| CN | 205720885 U | 11/2016 |
| CN | 206057698 U | 3/2017 |
| CN | 106802482 A | 6/2017 |
| CN | 107238930 A | 10/2017 |
| CN | 107275904 A | 10/2017 |
| DE | 102014017534 A1 | 5/2016 |
| EP | 3147748 A1 | 3/2017 |
| GB | 2499102 A | 7/2013 |
| JP | 2000357025 A | 12/2000 |
| JP | 2016005125 A | 1/2016 |
| KR | 20160105228 A | 9/2016 |
| KR | 20170023030 A | 3/2017 |

OTHER PUBLICATIONS

Office Action issued in corresponding Russian Application No. 2018105079/08(007709), dated Dec. 21, 2018, 7 pages.
Extended European Search Report dated May 2, 2019 corresponding to European Application No. 18175548.9, (17p).
Partial Search Report in corresponding European Application No. 18175548.9, dated Dec. 18, 2018, 17 pages.
English translation of International Search Report issued in corresponding International Application No. PCT/CN2017/112879, dated Apr. 17, 2018, 2 pages.
First Japanese Office Action to Japanese Patent Application No. 2018-503187, dated Sep. 17, 2019, (4p).
First Office Action to Korean Patent Application No. 10-2018-7031836, dated Nov. 20, 2019, (7p).

\* cited by examiner

VIRTUAL REALITY GLASSES

CROSS REFERENCE TO RELATED APPLICATION

The present application is based upon and claims priority to Chinese Patent Application No. CN201710591296.2, filed on Jul. 19, 2017, and the entire contents thereof are incorporated herein by reference.

TECHNICAL FIELD

The present disclosure relates to the field of terminal technology, and in particular, to virtual reality glasses.

BACKGROUND

Virtual Reality (VR) technology is a computer simulation system that can generate a simulation environment to provide users with an immersive application experience by means of three-dimensional dynamic scene, entity behavior interaction, and the like.

In the related art, a simple and feasible virtual reality solution is proposed by providing virtual reality glasses including virtual reality function members and providing virtual reality content playing by means of external electronic devices such as a user's cell phone, tablet, etc.

However, as the size, specification, material and the like of different external electronic devices differ greatly, if the electronic devices cannot be effectively limited, the electronic devices are prone to shake and sway during use, which may affect users' sense of immersion in the process and may even cause discomfort such as dizziness.

This section provides background information related to the present disclosure which is not necessarily prior art.

SUMMARY

The present disclosure provides virtual reality glasses to solve the deficiencies in the related art.

According to an aspect of the present disclosure, virtual reality glasses are provided, which may include: a glasses body and a data connecting line. The glasses body may be assembled with an external electronic device that plays virtual reality content. The data connection line may include a first connection plug at a first end, the first connection plug being engaged with a first interface on the glasses body to detachably connect the data connection line with the glasses body. The data connection line may also include a second connection plug at a second end, the second connection plug being engaged with a second interface of the external electronic device.

It is to be understood that both the foregoing general description and the following detailed description are exemplary and explanatory only and cannot limit the disclosure.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION

Exemplary embodiments will be described in detail here, examples of which are illustrated in the accompanying drawings. When the following description refers to the accompanying drawings, the same numerals in different drawings denote the same or similar members unless otherwise indicated. The implementations described in the following exemplary embodiments do not represent all implementations consistent with the present application. Rather, they are merely examples of the apparatus and method consistent with some aspects of the disclosure, as set forth in the appended claims.

The terminology used in the present application is for the purpose of describing particular embodiments only, and is not intended to limit the present application. As used in the present application and the appended claims, the singular forms "a", "the" and "that" are intended to include the plural forms unless otherwise clearly dictated in the context. It is also to be understood that the term "and/or" as used herein refers to and encompasses any or all possible combinations of one or more of the associated listed items.

It should be understood that although the terms "first", "second", "third", etc. may be used herein to describe various kinds of information, the information should not be limited to these terms. These terms are only used to distinguish the same type of information from each other. For example, the first information may also be referred to as second information without departing from the scope of the present application, and similarly, the second information may also be referred to as first information. Depending on the context, the word "if" as used herein may be interpreted as "when" or "during" or "in response to a determination."

Figure 1:
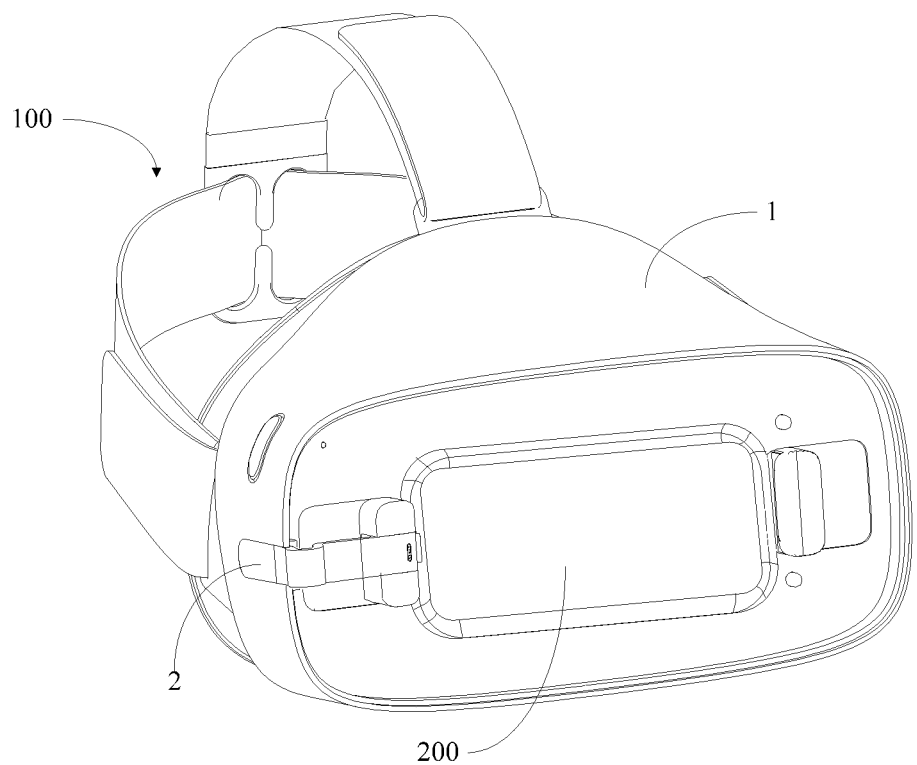
FIG. 1 is an assembly diagram of virtual reality glasses and an external electronic device according to an aspect of the disclosure.

FIG. 1 is a schematic assembly diagram of virtual reality glasses and an external electronic device according to an aspect of the disclosure. As shown in FIG. 1, the virtual reality glasses 100 includes a glasses body 1 and a data connection line 2. The glasses body 1 may be used to be assembled with an external electronic device 200 that plays virtual reality content such that when wearing the virtual reality glasses 100, the user can view the virtual reality content played by the external electronic device 200.

Figure 2:
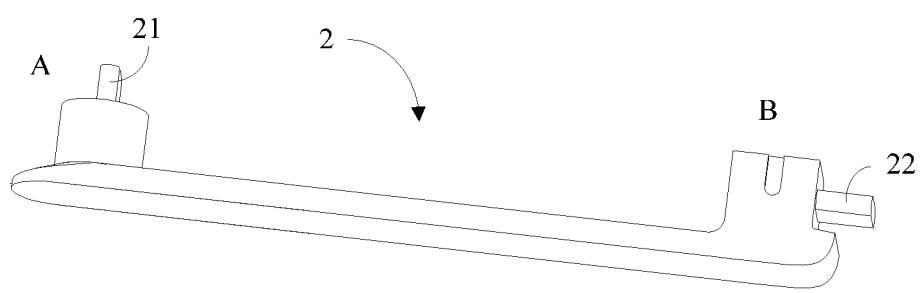
FIG. 2 is a schematic structural diagram of a data connection line according to an aspect of the disclosure.
Figure 3:
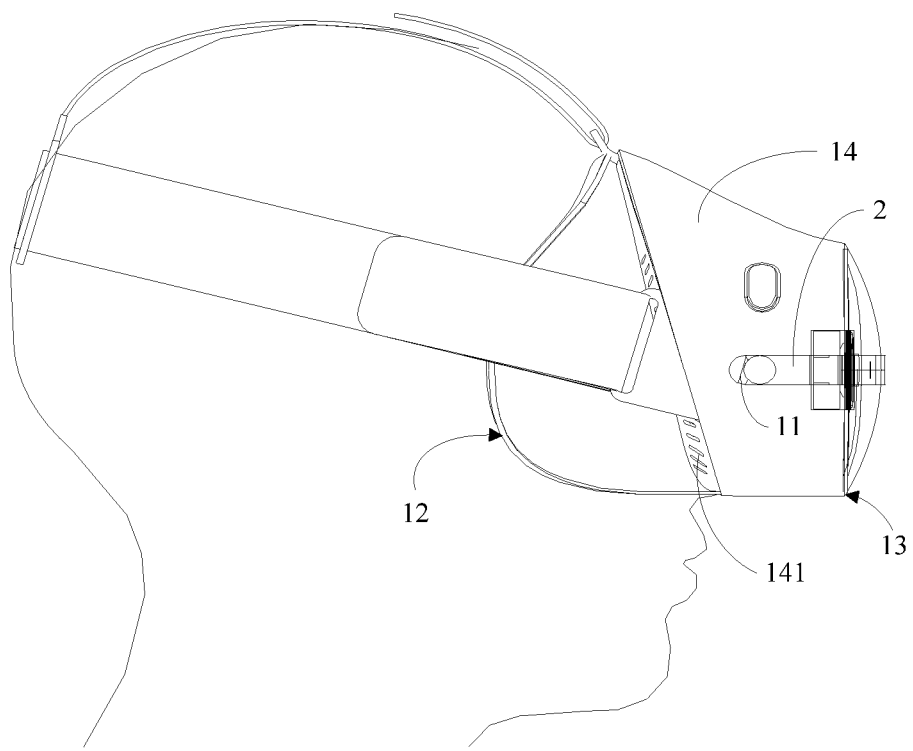
FIG. 3 is a schematic diagram of wearing virtual reality glasses according to an aspect of the disclosure.
Figure 4:
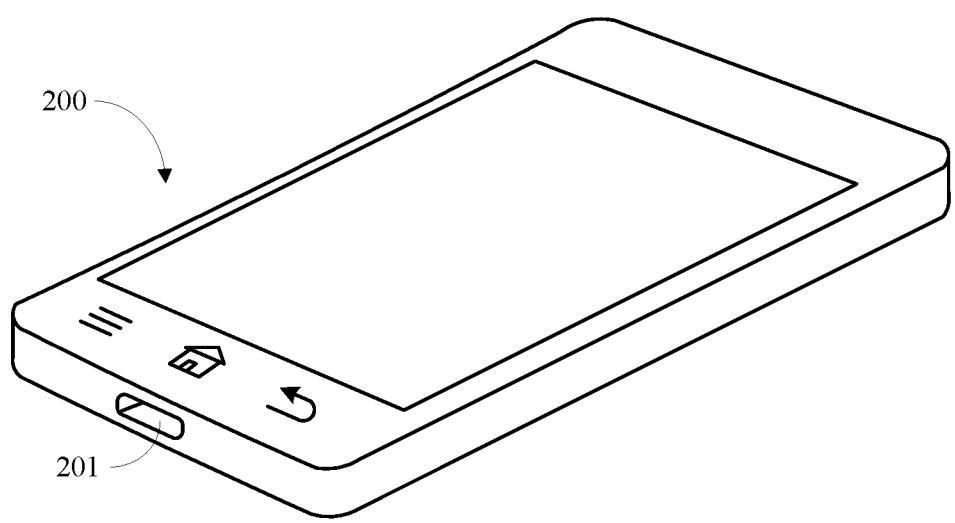
FIG. 4 is a schematic diagram of an electronic device according to an aspect of the disclosure.

As shown in FIG. 2, the data connection line 2 may include a first connection plug 21 located at a first end A and a second connection plug 22 located at a second end B. The first connection plug 21 may be engaged with a first interface 11 on the displayed glasses body 1 as shown in FIG. 3 such that the data connection line 2 is detachably connected to the glasses body 1. The second connection plug 22 can be adapted to a second interface 201 of the external electronic device 200 shown in FIG. 4, such that a signal connection between the virtual reality glasses 100 and the external electronic device 200 can be established through the data connection line 2. Therefore, the data connection line 2 in this embodiment can be quickly detached and separated from the glasses body 1, such that the user can equip the virtual reality glasses 1 with the corresponding type of data connection line 2 according to the specifications of the second interface 201. Thus, the glasses body 1 can accommodate different external electronic devices 200 with different interfaces, and the versatility of the virtual reality glasses 100 is improved.

For example, when the specification of the second interface 201 is a USB Type-C interface, a USB Type-C plug may be selected for the second connection plug 2 of the data connection line 2. For another example, when the specification of the second interface 201 is a Lighting interface, a lighting plug may be selected for the second connection plug 2 of the data connection line 2.

In one or more embodiments as shown in FIG. 3, the glasses body 1 may include a housing 14, a surface of the housing 14 facing the user's face being a first surface 12, a surface of the housing 14 for assembling the external electronic device 200 being a second surface 13, and the first interface 11 may be located at the sidewall of the housing 14 for facilitating the user to plug or detach the data connection line 2 with or from the glasses body 1.

For example, the first interface 11 may be disposed on the right side of the outer surface of the housing 14 according to the operation habit of most users, such that the user can easily plug or detach the data connection line 2 by commonly used right hand after wearing the virtual reality glasses 100. Similarly, the first interface 11 may be disposed at the left side of the outer surface of the housing 14, at the left side of the inner surface of the housing 14, or at the right side or any position of the inner surface of the housing 14.

In the technical solution of the present disclosure, the specific structure of the data connection line 2 used by the virtual reality glasses 100 is not limited. In fact, the data connection line 2 of any structure may be applied to the virtual reality glasses 100 of the present disclosure as much as possible, so as to be adapted to the glasses body 1.

Figure 5A:
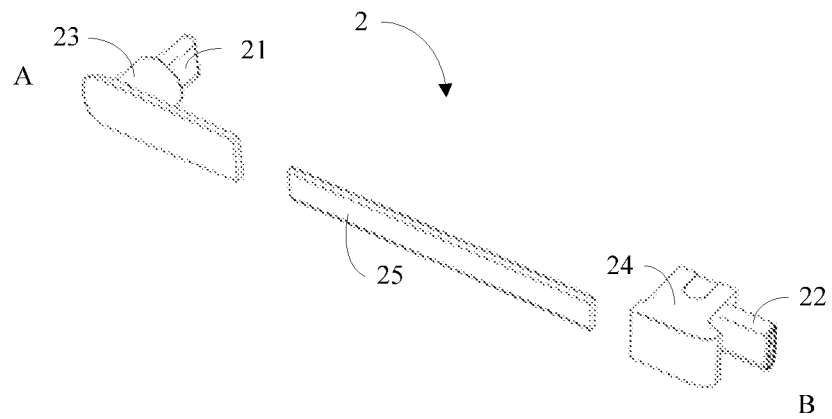
FIG. 5A is an exploded schematic view of a data connection line according to an aspect of the disclosure.

In one or more embodiments, as shown in FIG. 5A, the data connection line 2 may include a first connection portion 23 at the first end A, a second connection portion 24 at the second end B, and a data line body 25 between the first end A and the second end B. The first connection portion 23 and the second connection portion 24 are electrically connected to the data line body 25 through physical lines. The end of the first connection portion 23 includes a first connection plug 21, and the end of the second connection portion 24 includes a second connection plug 22. The data line body 25 may be made of an elastic material, or the data connection line 2 may be made of an elastic material as a whole such that when the separation distance between the first interface 11 and the second interface 201 changes due to the difference in external dimensions of the external electronic device 200, the data connection line 2 can be adaptively deformed. For example, in FIG. 1, when the external dimensions of the external electronic device 200 are large, leading to a small separation distance between the first interface 11 and the second interface 201, the data connection line 2 may be bent so as to adapt to the separation distance.

Figure 5B:
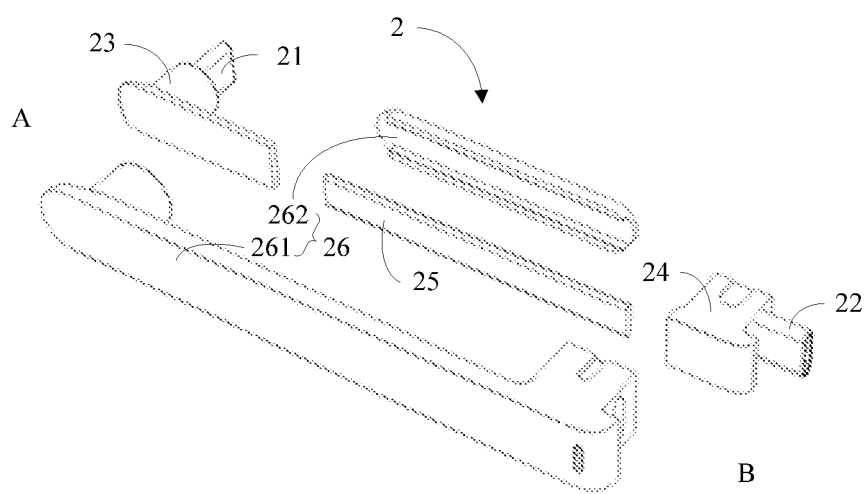
FIG. 5B is an exploded schematic view of another data connection line according to an aspect of the disclosure.
Figure 5C:
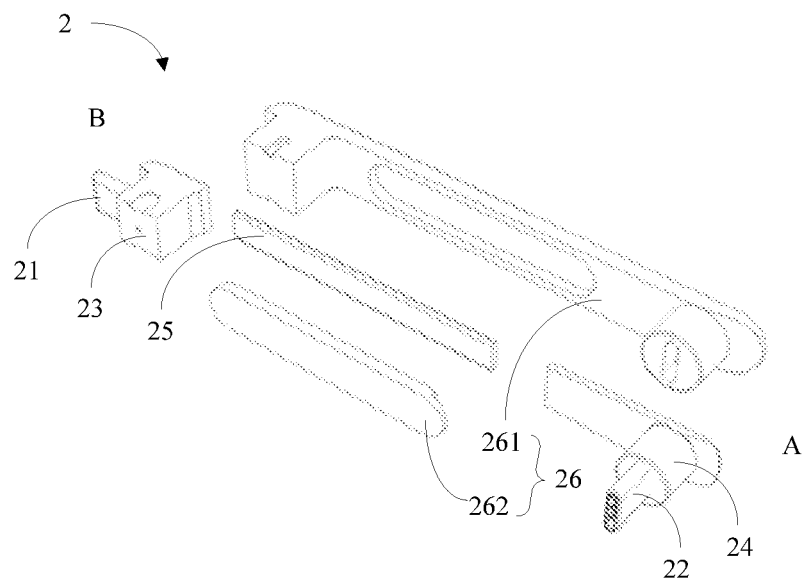
FIG. 5C is an exploded schematic view of another data connection line according to an aspect of the disclosure.
Figure 5D:
FIG. 5D is a schematic side view of a data connection line according to an aspect of the disclosure.
Figure 5E:
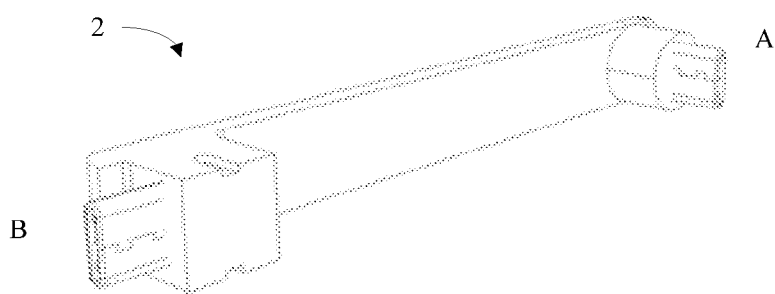
FIG. 5E is a schematic oblique side view of a data connection line according to an aspect of the disclosure.
Figure 5F:
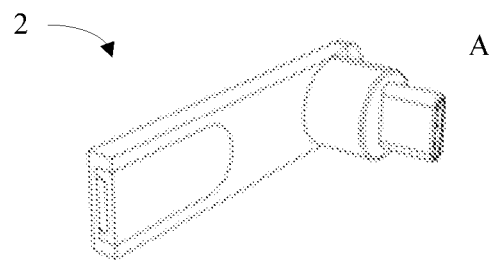
FIG. 5F is a schematic cross-sectional view of a data connection line according to an aspect of the disclosure.

As shown in FIG. 5B and FIG. 5C, the data connection line 2 can be injection-molded to form an injection molded member 26 enclosing the first connection portion 23, the second connection portion 24 and the data line body 25, so as to, on the one hand, protect the internal circuit of the data connection line 2 to reduce the probability of damage, and on the other hand, achieve the adaptive assembly with other structures (this will be described below in detail, and here will not be repeated). Here, the injection molding 26 can be injection-molded through one process or can be injection-molded through multiple processes. After the injection molding, as shown in FIG. 5D, there is the front side view of the data connection line 2. As shown in FIG. 5E, an oblique side view of the data connection line 2 is shown. As shown in FIG. 5F, a cross-sectional view of the data connection line 2 is shown. The disclosure does not limit the approach of injection molding, for example:

In one case, the first connection portion 23, the second connection portion 24, and the data line body 25 can all be disposed in an injection mold so as to form the injection molded member 26 wrapped outside.

In another case, the first connection portion 23, the second connection portion 24 and the data line body 25 can all be disposed in a first mold so as to form a first injection molded member 261 that at least encloses the first connection portion 23, the second connection portion 24 and the data line body 25; and an injection molding can be performed separately through a second mold to obtain a second injection molded member 262 adapted to the first injection molded member 261, and then the first injection molded member 261 and the second injection molded member 262 are assembled to obtain the injection molded member 26.

In still another case, the first connection portion 23, the second connection portion 24 and the data line body 25 can all be placed in the first mold for injection molding to obtain the first injection molded member 261, and then the first injection molded member 261 can be integrally disposed into the second mold for injection molding to obtain the second injection molded member 262, and the injection molded member 26 is formed directly.

Figure 6:
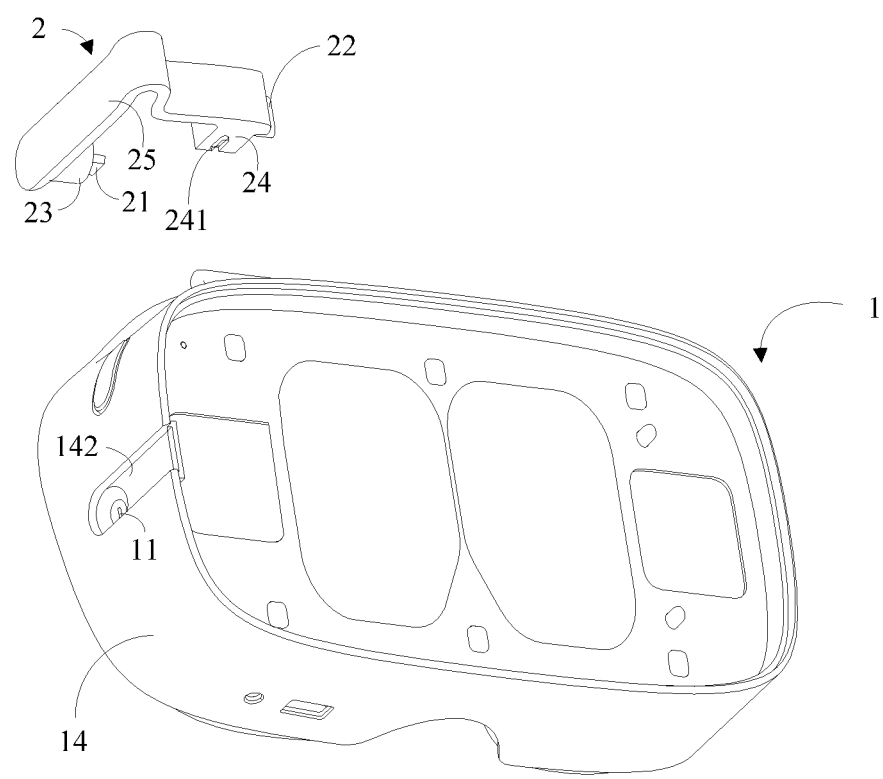
FIG. 6 is a partially exploded schematic view of virtual reality glasses according to an aspect of the disclosure.

When the first interface 11 is disposed on the right side of the outer surface of the housing 14, as shown in FIG. 6, a first groove 142 may be formed on the surface of the housing 14 of the glasses body 1. The data connection line 2 may be adapted to the first groove 142 through the injection molded member 26 formed in the above embodiment. Thus, the first groove 142 may receive the first connection portion 23 and at least a portion of the data line body 25, and the first groove 142 may accommodate and limit the data connection line 2, to avoid the data connection line 2 scattered. The first interface 11 may be located in the first groove 142. For example, the first interface 11 is located on the side of the first groove 142 facing the inner side of the housing 14. And the interface specification of the first interface 11 is adapted to the specification of the first connection plug 21 of the data connection line 2.

Further, after the data connection line 2 is assembled to the glasses body 1, the surfaces of the first connection portion 23 and at least a portion of the data line body 25 may be aligned with the surface of the housing 14 of the glasses body 1 (as shown in FIG. 1), and this helps to improve the integrity between the data connection line 2 and the glasses body 1 so as to improve the aesthetics of the virtual reality glasses 100.

In the technical solution of the present disclosure, depending on the structure of the first groove 142 and the arrangement of the first interface 11 in the first groove 142, there may be a plurality of ways to plug the first connection plug 21 with the first interface 11.

In one or more embodiments, as shown in FIG. 6, the first groove 142 may be formed by the outer surface of the housing 14 being depressed toward the inner side of the housing 14. The depth of the first groove 142 can be adapted to the thickness of the data line body 25 of the data connection line 2, and the width of the first groove 142 can be adapted to the width of the data line body 25 of the data connection line 2. In addition, the shape of the inner sidewall of the first groove 142 may also be adapted to the shape of one end of the data line body 25 of the data connection line 2. The first interface 11 may be located on the bottom of the first groove 142 in the depth direction such that the first connection plug 21 can be plugged with the first interface 11 in a direction perpendicular to the outer surface of the housing 14 to be connected to the glasses body 1. In some embodiments, the surface of the first groove 142 may also be inclined such that the first connection plug 21 may be plugged with the first interface 11 obliquely, rather than perpendicular to the outer surface of the housing 14. The present disclosure does not limit the angular relationship between the first connection plug 23 and the outer surface of the housing 14. Correspondingly, in order to be engaged with the first groove 142 and the first interface 11, the first connection plug 21 can be perpendicular to the connection direction of the first end A and the second end B (the data connection line 2 shown in FIG. 6 is consistent with the embodiment shown in FIGS. 2 and 5A-5F), such that when the data line body 25 is parallel to the housing 14, the first connection plug 21 may be perpendicular to the housing 14 and be plugged with the first interface 11, so that it can enable "the first groove 142 to receive the first connection portion 23 and at least a portion of the data line body 25" as much as possible.

Figure 7:
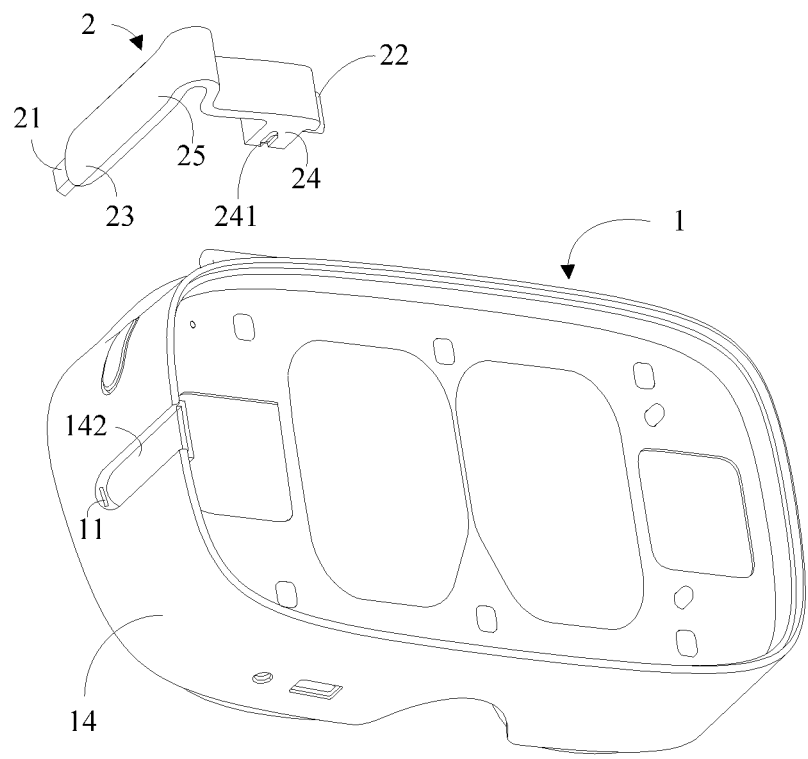
FIG. 7 is a partially exploded schematic view of another virtual reality glasses according to an aspect of the disclosure.

In one or more embodiments, as shown in FIG. 7, the first groove 142 may be formed by the outer surface of the housing 14 being depressed toward the inner side of the housing 14. The depth of the first groove 142 can be adjusted to the thickness of the data line body 25 of the data connection line 2. The width of the first groove 142 can be adapted to the width of the data line body 25 of the data connection line 2. In addition, the shape of the inner sidewall of the first groove 142 may also be adapted to the shape of one end of the data line body 25 of the data connection line 2. The first interface 11 may be located on the sidewall of the first groove 142 such that the first connection plug 23 can be plugged with the first interface 11 in a direction parallel to the surface of the housing 14 so as to be connected to the glasses body 1; in some embodiments, the surface of the first groove 142 may also be inclined, such that the first connection plug 23 may be plugged with the first interface 11 obliquely and not parallel to the outer surface of the housing 14, and the disclosure is not limited to the angular relationship between the first connection plug 23 and the outer surface of the housing 14. Correspondingly, in order to be engaged with the first groove 142 and the first interface 11, in the data connection line 2 shown in FIG. 8, the first connection plug 21 may be parallel to the connection direction of the first end A and the second end B such that the first connection plug 21 can be parallel to the housing 14 and can be plugged with the first connection 11 in the case that the data line body 25 is parallel to the housing 14 so as to enable "the first groove 142 to receive the first connection portion 23 and at least a portion of the data line body 25" as described hereinabove as much as possible.

In some embodiments, the first interface 11 may also be located at other positions of the first groove 142, and the position and structure of the first connection plug 21 on the data connection line 2 may also be adaptively changed such that the first connection plug 21, when assembled to the first interface 11, can enable "the first groove 142 to receive the first connection portion 23 and at least a portion of the data line body 25" as described hereinabove as much as possible.

It should be noted that although the embodiments are described hereinabove by taking the first interface 11 being located on the right side of the outer surface of the housing 14 as an example, those skilled in the art should understand that when the first interface 11 is disposed on the left side of the outer surface, the right side of the inner surface, or the left side of the inner surface, of the housing 14, the arrangement in FIG. 6 or FIG. 7 can also be used, which is not described herein again.

For ease of understanding, all the following embodiments are described by example of the data connection lines 2 in the examples shown in FIG. 2, FIGS. 5A-5F and FIG. 6.

With regard to the assembly of the second connection plug 22 of the data connection line 2 with the second interface 201 of the external electronic device 200, the second connection portion 24 of the data connection line 2 can be detachably fixed to the corresponding structure on the glasses body 1, so as to prevent the second connection portion 24 from swaying to cause the connection between the second connection plug 22 and the second interface 201 to be unstable.

Figure 8:
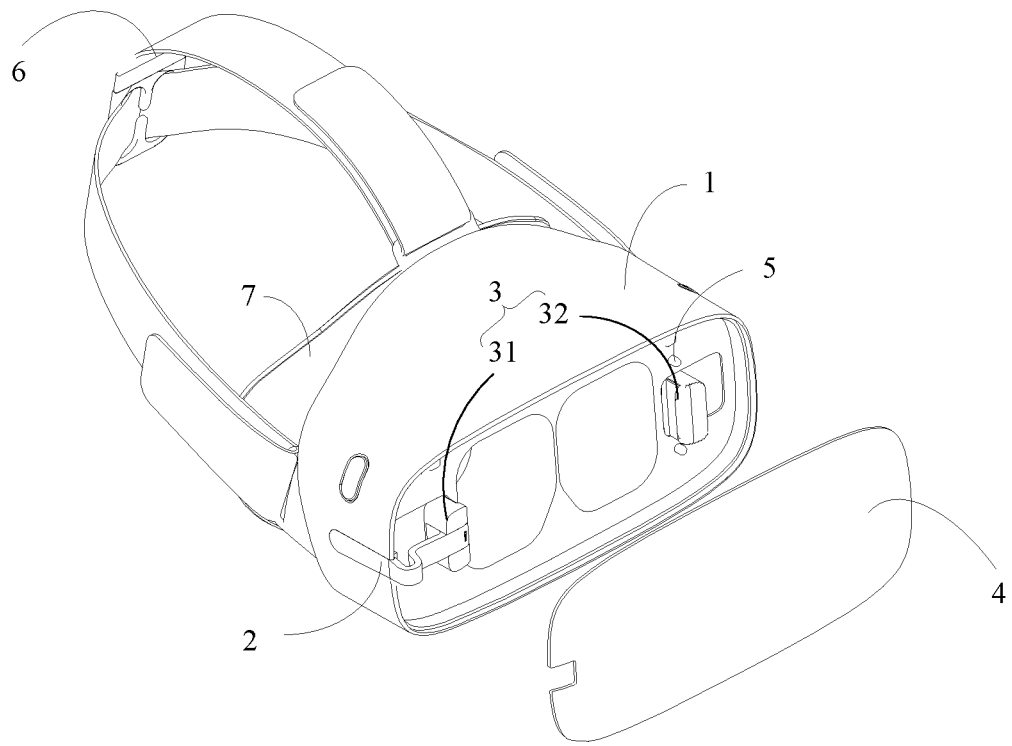
FIG. 8 is an exploded schematic view of another virtual reality glasses according to an aspect of the disclosure.

In an aspect of the disclosure, the virtual reality glasses 100 may include a fastening structure 3 as shown in FIG. 8, the fastening structure 3 including a first fastening portion 31 and a second fastening portion 32, and the external electronic device 200 may be fastened by the first fastening portion 31 and the second fastening portion 32 from both ends, the fastened state referring to FIG. 1. With respect to the fastening structure 3, the subsequent embodiments will be described in detail, and the details thereof are not described herein again. Then, the second connection portion 24 of the data connection line 2 can be engaged with the first fastening portion 31 or the second fastening portion 32 to achieve the detachable fixation with the glasses body 1.

Figure 9:
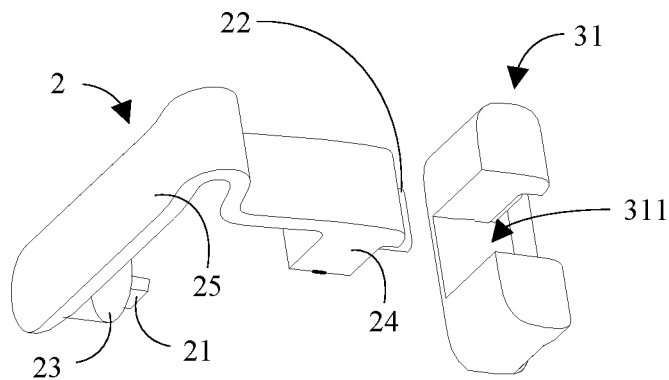
FIG. 9 is a schematic diagram of installation of a data connection line and a first fastening portion according to an aspect of the disclosure.

For example, as shown in FIG. 9, as the first fastening portion 31 is closer to the data connection line 2 than the second fastening portion 32, the second connection portion 24 of the data connection line 2 can be detachably connected to the first fastening portion 31 such that the data connection line is detachably fixed on the glasses body 1. A receiving space 311 may be formed on the first fastening portion 31, and the receiving space 311 may be used for receiving the second connection portion 24 of the data connection line 2, and the second connection plug 22 connected to the second connection portion 24 may protrude from the first fastening portion 31 and face toward the corresponding end face of the external electronic device 200 so as to be assembled with the second interface 201.

FIG. 9 shows an example. When the second connection portion 24 is made of an elastic material, the width dimension of the receiving space 311 may be slightly smaller than the width dimension of the second connection portion 24, and then, the second connection portion 24 and the first fastening portion 31 can be detachably connected through the interference fit between the second connection portion 24 and the receiving space 311.

Figure 10:
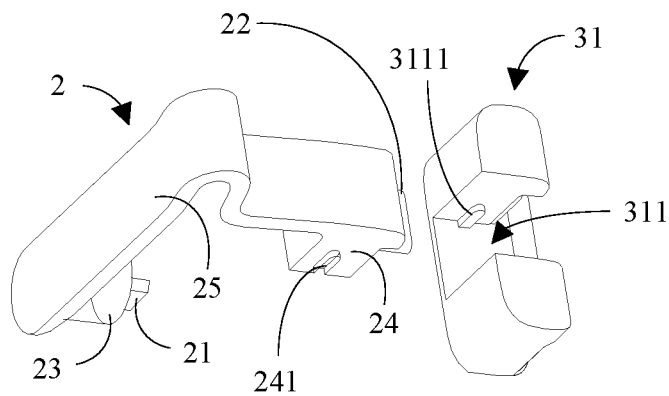
FIG. 10 is a schematic diagram of installation of another data connection line and the first fastening portion according to an aspect of the disclosure.

In one or more embodiments, as shown in FIG. 10, the sidewall forming the receiving space 311 may extend to form a protruding block 3111. Correspondingly, a second groove 241 adapted to the protruding block 3111 may be formed on the second connection portion 24. When the second connection portion 24 is assembled to the first fastening portion 31, the protruding block 3111 and the second groove 241 can be engaged with each other so as to fix and limit the second connection portion 24 to achieve the connection between the second connection portion 24 and the first fastening portion 31. When an external force is applied to the second connection portion 24 and releases the engagement between the protruding block 3111 and the second groove 241 in the opposite direction, the second connection portion 24 can be separated from the first fastening portion 31.

In each of the embodiments described above, the receiving space 311 may be formed by the surface of the first fastening portion 31 away from the glasses body 1 being depressed in a direction toward the interior of the glasses body 1. Then, the second connection portion 24 of the data connection line 2 can be fastened and assembled in a direction toward the glasses body 1 for convenient operation.

Further, the virtual reality glasses 100 may further include a cover 4 as shown in FIG. 8. The cover 4 is detachably connected to the glasses body 1 to cover and protect the external electronic device 200 assembled to the glasses body 1. Here, the side of the cover 4 close to the glasses body 1 (i.e. the inner surface of the cover 4) may abut against a surface of the second connection portion 24 of the data connection line 2 assembled to the receiving space 311 (i.e. the outer surface of the second connection portion 24 toward the cover 4), to limit the data connection line 2 in the assembling direction of the cover 4 so as to limit the movement of the second connection portion 24 relative to the first fastening portion 31, which can prevent the second connection portion 24 of the data connection line 2 from slipping off.

For ease of understanding, the engagement between the fastening structure 3 and the external electronic device 200 will be described below in conjunction to specific embodiments.

Figure 11:
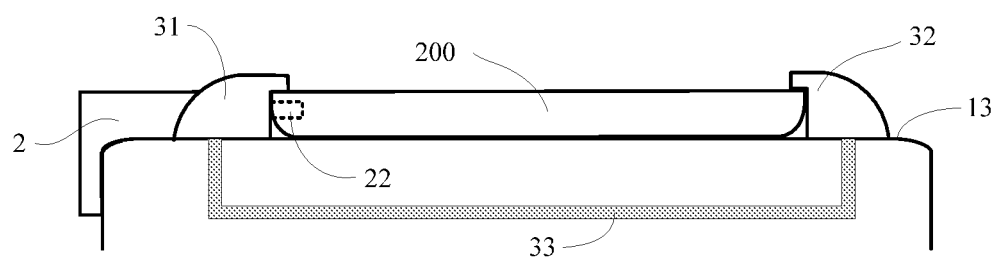
FIG. 11 is a schematic diagram of a fastening structure for fastening an external electronic device according to an aspect of the disclosure.

For example, as shown in FIG. 11, one end of the external electronic device 200 having the second interface 201 may be fastened by the first fastening portion 31 of the fastening structure 3, and the other opposite end of the external electronic device 200 may be fastened by the second fastening portion 32. Here, the distance between the first fastening portion 31 and the first end A of the data connection line 2 is smaller than the distance between the second fastening portion 32 and the first end A of the data connection line 2 such that when it is guaranteed that the second connection plug 22 of the data connection line 2 is plugged with the second interface 201 of the external electronic device 200, the length of the data connection line 2 can be shortened as much as possible to prevent the data connection line 2 from being scattered inside or outside the virtual reality glasses 100.

Figure 12:
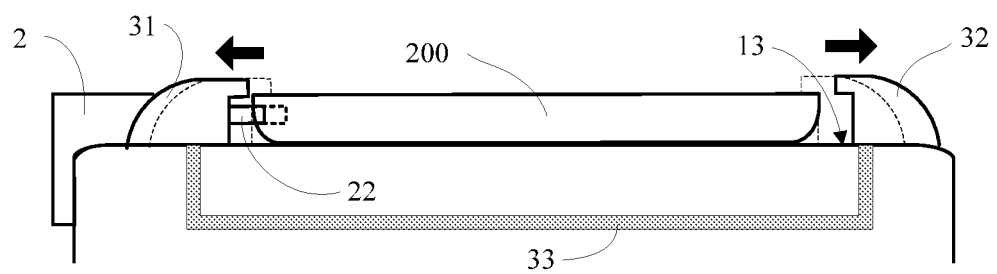
FIG. 12 is a schematic diagram of a fastening structure for releasing the fastening of an external electronic device according to an aspect of the disclosure.

The fastening structure 3 may further include a transmission portion 33. The two ends of the transmission portion 33 may be respectively engaged with the first fastening portion 31 and the second fastening portion 32. As shown in FIG. 12, when any one of the first fastening portion 31 and the second fastening portion 32 moves in a preset direction, the transmission portion 33 can drive the other one to move in a linked way toward the direction opposite to the preset direction, on the one hand, to be applied to electronic devices of different specifications and on the other hand, to facilitate the plugging and detachment between the second connection plug 22 of the data connection line 2 and the second interface 201 of the external electronic device 200, so as to achieve the detachment and separation between the external electronic device 200 and the virtual reality glasses 100.

Figure 13:
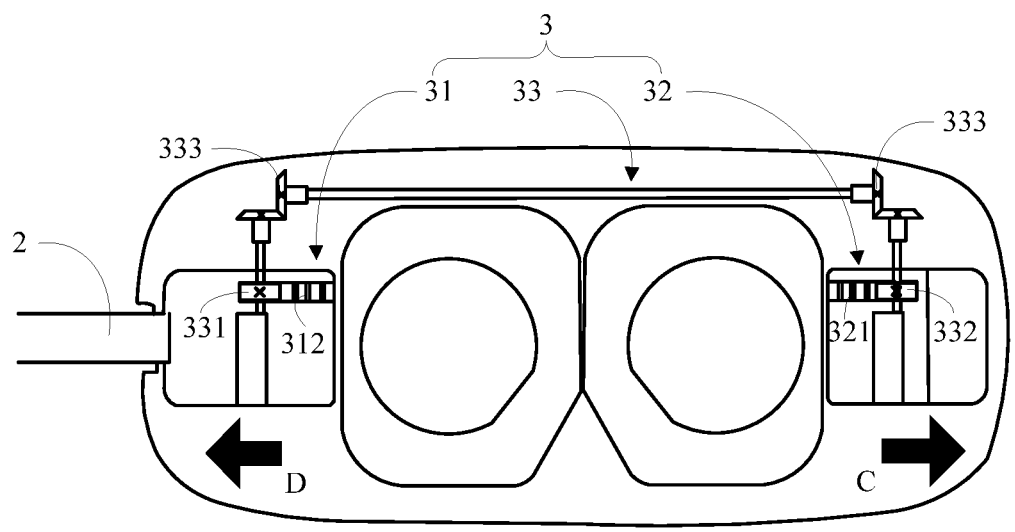
FIG. 13 is a first perspective view of virtual reality glasses according to an aspect of the disclosure.

In one or more embodiments, as shown in FIG. 13, the first fastening portion 31 and the second fastening portion 32 may respectively include a fourth transmission member 312 and a fifth transmission member 321, the fourth transmission member 312 and the fifth transmission member 321 being respectively engaged with the first transmission member 331 and the second transmission member 332 at the two ends of the transmission portion 33. Then, when an external force is applied to the second fastening portion 32 and causes the second fastening portion 32 to move in the direction of the arrow C, the fifth transmission member 321 can drive the second transmission member 332 to rotate and further drive the first transmission member 331 to rotate in the opposite direction, such that the fourth transmission member 312 moves in the direction of the arrow D shown in the figure. Thus, the first fastening portion 31 and the second fastening portion 32 may be separated from each other. When the second fastening portion 32 moves in the direction opposite to the direction indicated by the arrow C, the first fastening portion 31 and the second fastening portion 32 may be brought close to each other. When an external force is applied to the first fastening portion 31 and cause the first fastening portion 31 to move, it may also cause the second fastening portion 32 to move in a linked way, which is not described herein again.

Here, the fourth transmission member 312 and the fifth transmission member 321 may be a rack respectively fixed onto the first fastening portion 31 and the second fastening portion 32, and the first transmission member 331 and the second transmission member 332 may respectively be gears engaged with the rack. Various structural relationships may be adopted between the rack and the first fastening portion 31 or the second fastening portion 32 according to the molding manner of the rack. Taking the rack engaged with the first fastening portion 31 as an example, the rack may be molded independently of the first fastening portion 31 so as to be fixed to the first fastening portion 31 by means of bolts, welding, adhesion, etc., or may be directly formed on the first fastening portion 31. The fourth transmission member 312 and the fifth transmission member 321 can both adopt any of the above-mentioned structural relationships, with same or different corresponding structural relationships therebetween, which are not limited in the present disclosure.

In some embodiments, the transmission portion 33 may further include a third transmission member 333 engaged with the first transmission member 331 and the second transmission member 332. The third transmission member 333 may enable the first transmission member 331 and the second transmission member 332 to move in a linked way and further enable the first fastening portion 31 and the second fastening portion 32 to move in a linked way.

Figure 14:
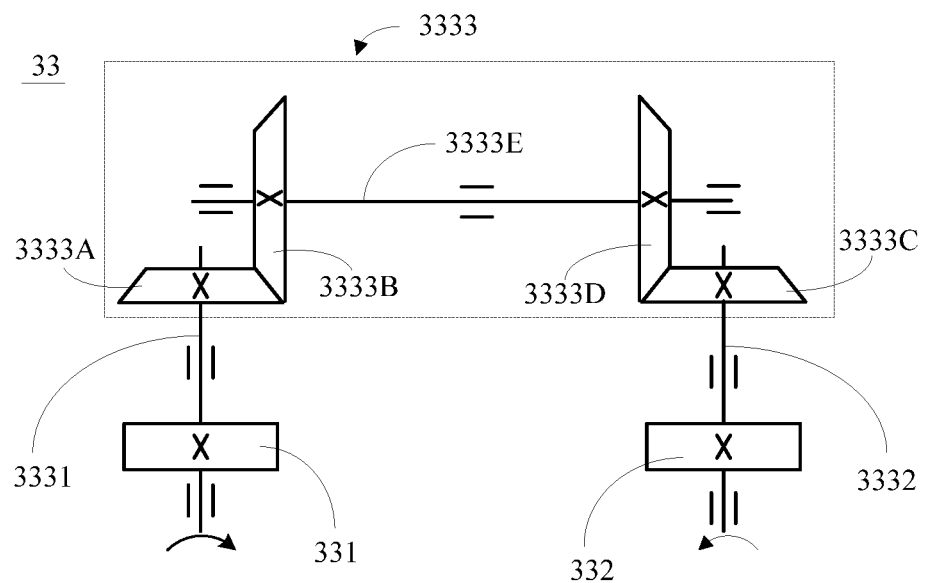
FIG. 14 is a schematic diagram of the transmission of a transmission portion of virtual reality glasses according to an aspect of the disclosure.

For example, as shown in FIG. 14, the third transmission member 333 may include a first transmission shaft 3331 and a second transmission shaft 3332 respectively engaged with the first transmission member 331 and the second transmission member 332, and an engaging member 3333 engaged with a transmission shaft 3331 and a second transmission shaft 3332; wherein the first transmission shaft 3331 and the second transmission shaft 3332 rotate in opposite directions, to drive the fourth transmission member 312 and the fifth transmission member 321 to move toward different directions such that the first fastening portion 31 and the second fastening portion 32 move toward different directions.

In one or more embodiments, as shown within the dashed box in FIG. 14, the engaging member 3333 may include a first bevel gear set composed of a first bevel gear 3333A and a second bevel gear 3333B, a second bevel gear set composed of a third bevel gear 3333C, and a fourth bevel gear 3333D, and a rotational shaft 3333E connected between the second bevel gear 3333B and the fourth bevel gear 3333D, such that the first bevel gear set and the second bevel gear set change the movement directions while transmitting movements by means of the engagement therebetween, so as to achieve the translational linked movement between the first fastening portion 31 and the second fastening portion 32. Of course, in other embodiments, the engaging member 3333 can also include three or more pairs of bevel gear sets and the rotational shaft, which is not limited in the present disclosure.

In one or more embodiments, the engaging member 3333 may include two motors engaged with the first transmission shaft 3331 and the second transmission shaft 3332, respectively. Then, when detecting that one of the motors is in the working state, the virtual reality glasses 100 may switch the other motor to the activated state to drive the first fastening portion 31 and the second fastening portion 32 to move at the same time period. The first transmission shaft 3331 and the second transmission shaft 3332 may be power output shafts corresponding to the motors. Alternatively, the motors may be respectively engaged with the first transmission shaft 3331 or the second transmission shaft 3332 through another transmission structure, which is not limited in the present disclosure.

Figure 15:
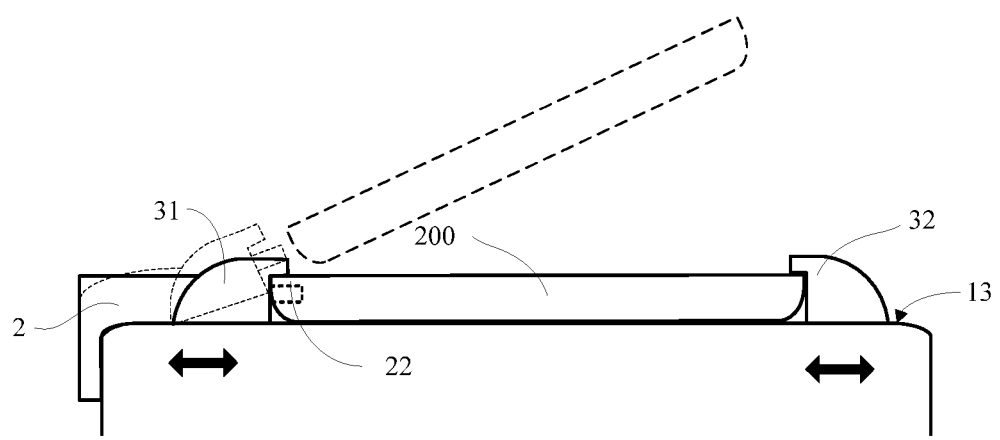
FIG. 15 is a schematic diagram of a fastening structure for fastening an external electronic device according to an aspect of the disclosure.

In an aspect of the present disclosure, the angle of the second connection plug 22 can be adjusted to facilitate the assembly of the external electronic device 200. As shown in FIG. 15, when the external electronic device 200 is finally assembled to the second surface 13, the interface on the external electronic device 200 and the second connection plug 22 are at a horizontal fastening angle. If the angle of the second connection plug 22 cannot be adjusted, the second connection plug 22 is always maintained at a horizontal fastening angle. When the user plugs the interface of the external electronic device 200 with the second connection plug 22, due to the obstruction from the second fastening portion 32, the external electronic device 200 can be plugged with the second connection plug 22 while maintaining a preset angle only with the second surface 13. In other words, the external electronic device 200 inevitably has an angle with the second connection plug 22, which results in difficulty in plugging the external electronic device 200 with the second connection plug 22, and may further lead to the breakage of the second connection plug 22 during plugging.

Therefore, when the second connection portion 24 of the data connection line 2 is detachably connected to the first fastening portion 31, the present disclosure can achieve a preset inclined opening angle for the second connection plug 22 by improving the structure of the first fastening portion 31 (that is, the situation indicated by the dashed line in FIG. 15), such that when the second connection plug 22 rotates to be parallel to the external electronic device 200, it can be ensured that the second connection plug 22 is aligned with the interface of the external electronic device 200 in parallel, which not only facilitates the plugging, but also effectively avoids the breakage of the second connection plug 22.

Figure 16A:
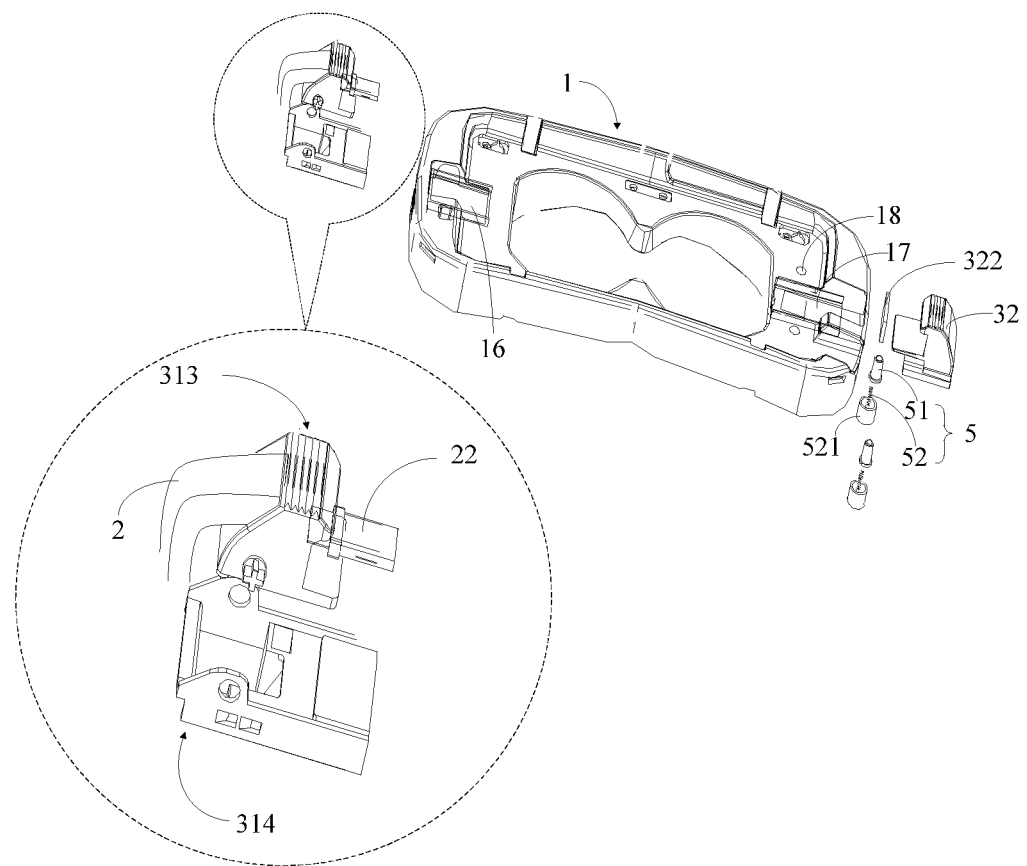
FIGS. 16A-16B are partially exploded views of virtual reality glasses according to an aspect of the disclosure.
Figure 16B:
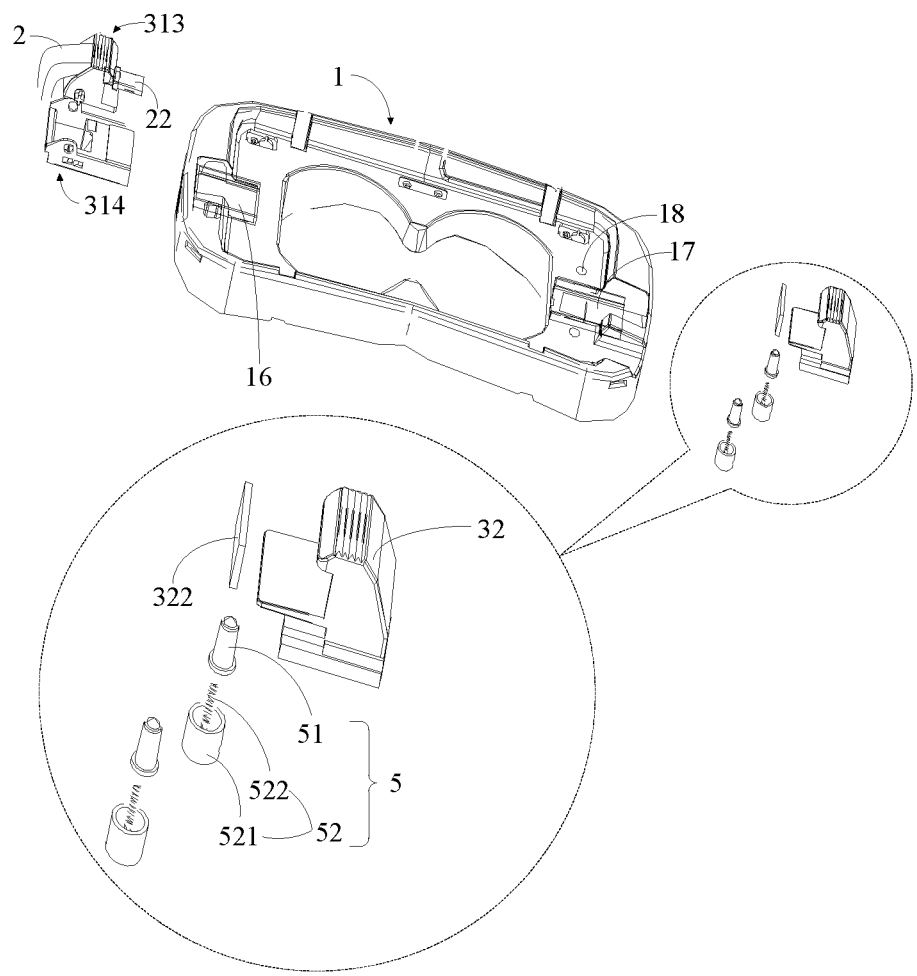

As shown in FIG. 16A and FIG. 16B, the first fastening portion 31 may include a first fastening seat 313 and a first movable plate 314 that are hinged such that the first fastening seat 313 may rotate relative to the first movable plate 314 between a preset maximum inclined opening angle and a horizontal fastening angle, so as to further drive the second connection plug 22 to rotate between a preset maximum inclined opening angle and a horizontal fastening angle, to facilitate the assembly of the data connection line 2 with the external electronic device 200. Wherein, the first fastening seat 313 can fasten the end of the external electronic device 200 having the second interface 201 at a horizontal fastening angle.

In some embodiments, the first movable plate 314 can slide relative to the first slideway 16 on the glasses body 1 so as to drive the first fastening seat 313 to reciprocate relative to the glasses body 1. Then, when the first fastening portion 31 and the second fastening portion 32 are engaged through the transmission portion 33 in the manner shown in any one of the embodiments shown in FIGS. 11-13, and the second fastening portion 32 can reciprocate relative to the second slideway 17, the second connection plug 22 can be moved horizontally or be rotated relative to the horizontal direction, further facilitating the assembly and separation of the external electronic device 200.

For example, a fourth transmission member 312 engaged with the transmission portion 33 may be disposed on the side of the first movable plate 314 facing the transmission portion 33, and an opening may be opened at a corresponding position of the first slideway 16, so that the fourth transmission member 312 may be engaged with the first transmission member 331 on the transmission portion 33 through the opening. Similarly, a fifth transmission member 321 engaged with the transmission portion 33 may be disposed on the side of the second fastening portion 32 facing the transmission portion 33, and an opening is opening at a corresponding position of the second slideway 17, such that the fifth transmission member 321 can be engaged with the second transmission member 332 on the transmission portion 33 through the opening.

Figure 16C:
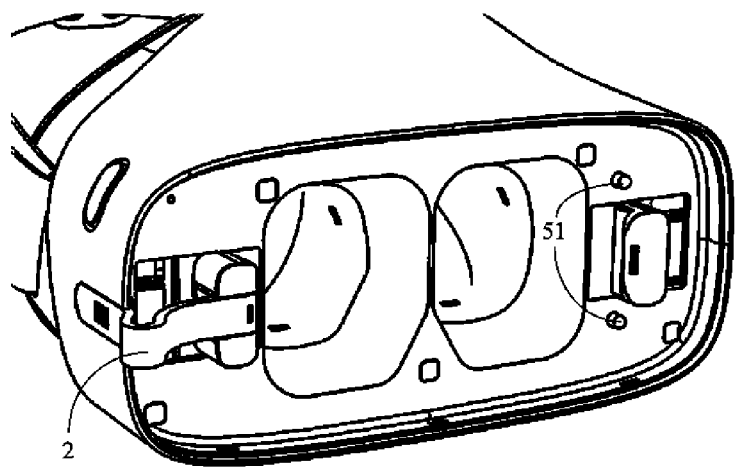
FIG. 16C is a schematic view of the state of a support member when an external electronic device is not assembled according to an aspect of the disclosure.
Figure 16D:
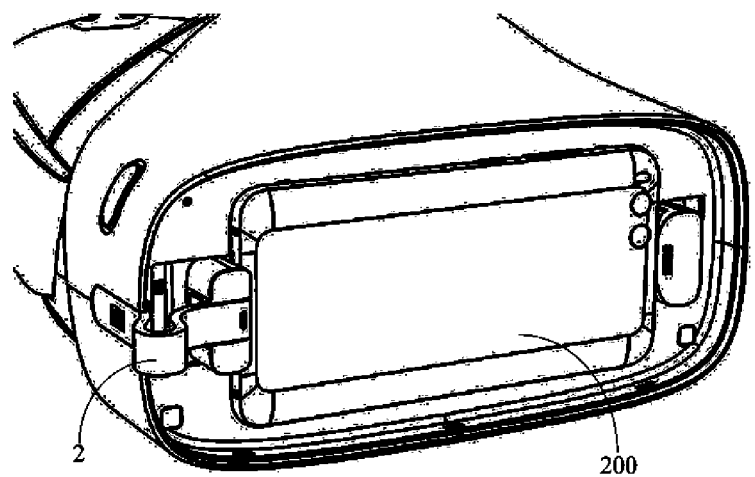
FIG. 16D is a schematic rear view with an external electronic device being assembled according to an aspect of the disclosure.
Figure 16E:
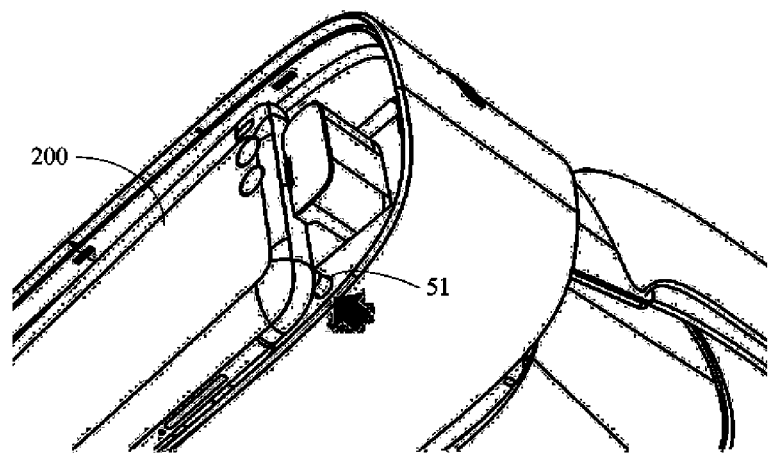
FIG. 16E is a schematic diagram of a process of removing an external electronic device according to an aspect of the disclosure.
Figure 16F:
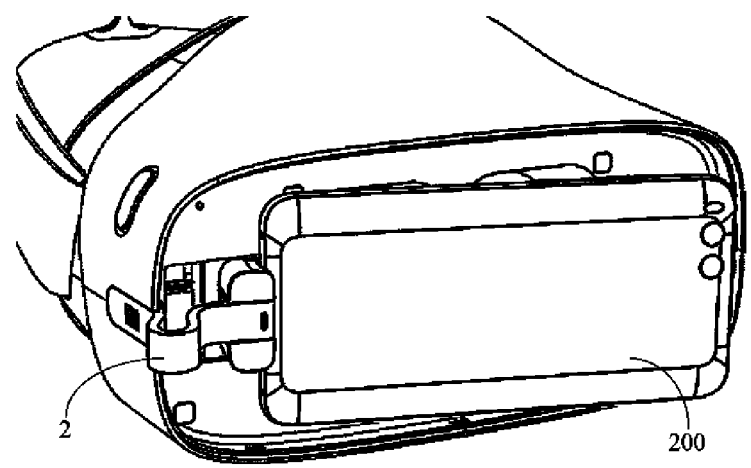
FIG. 16F is a schematic diagram of a process of removing an external electronic device according to an aspect of the disclosure.
Figure 17:
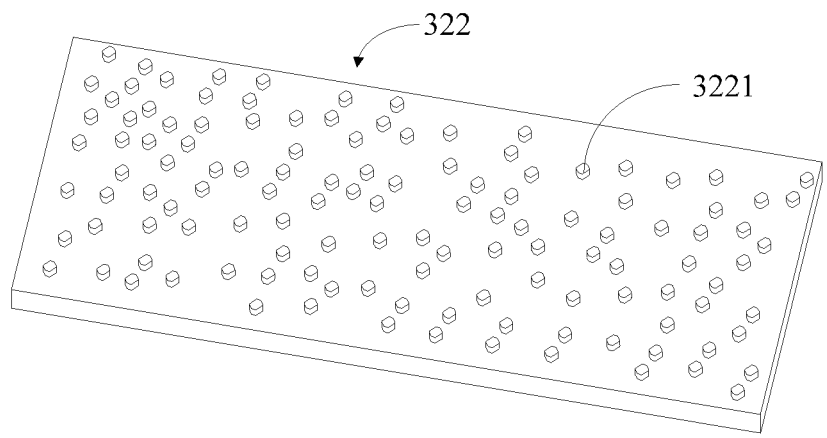
FIG. 17 is a schematic structural diagram of an abutting member according to an aspect of the disclosure.

In each of the above embodiments, the second fastening portion 32 may include an abutting member 322 abutting against a corresponding end face of the external electronic device 200. As shown in FIGS. 16C-17, the abutting member 322 may include a plurality of protrusions 3221 disposed relative to the external electronic device 200, to increase the frictional force between the external electronic device 200 and the second fastening portion 32. By this frictional force, the movement of the external electronic device 200 relative to the second fastening portion 32 can be restricted. Further, the abutting member 322 and/or the plurality of protrusions 3221 can be made of a material having cushioning properties, for example, silicon rubber, ethylene-vinyl acetate copolymer, rubber and plastic foaming material made of ethylene-vinyl acetate copolymer, etc., which is not limited in the present disclosure. The housing of the external electronic device 200 may be protected from wear by the abutting member 322 and/or the plurality of protrusions 3221 having cushioning properties. The plurality of protrusions 3221 may be columnar bodies arranged regularly or irregularly on the abutting member 322, strip bodies regularly or irregularly arranged on the abutting member 322 or have other shapes.

As shown in FIG. 16B, in order to facilitate the disassembly of the external electronic device 200, the virtual reality glasses 100 of the present disclosure may further include a device flipping structure 5. The device flipping structure 5 may include a support member 51 located in a preset opening 18 and an elastic member 52 disposed at the bottom of the support member 51. The preset opening 18 is located on the surface of the glasses body 1 relative to the external electronic device 200, that is, on the second surface 13. For example, the elastic member 52 may include a base 521 and a spring 522. The base 521 is provided with a top opening through which the spring 522 is disposed in the base 521. The top opening is engaged with the preset opening 18 such that a support column 51 can be engaged with the spring 522 after passing through the preset opening 18 such that the support column 51 and the spring 522 can be moved synchronously along the preset opening 18 to achieve the flipping of the external electronic device 200.

As shown in FIG. 16C, when the external electronic device 200 has not yet been assembled, the support member 51 may at least partially protrude out of the preset opening 18, and the elastic member 52 has almost no deformation. As shown in FIG. 16D, when the external electronic device 200 is fastened to the corresponding surface, the external electronic device 200 may press the support member 51, such that the elastic member 52 at the bottom of the support member 51 is changed from the initial state to a compressed state due to being pressed, and the support member 51 is at least partially retracted into the preset opening 18. For example, as shown in FIG. 16B, it can be understood that the spring 522 is compressed from the initial state to change to the compressed state. As shown in FIG. 16E, when the fastening structure 3 releases the fastening of the external electronic device 200, the elastic member 52 gradually returns from the compressed state to the initial state due to the disappearance of the external force, for example, as shown in FIG. 16B, it can be understood that the spring 522 gradually returns from the compressed state to the initial state to generate a reaction force toward the external electronic device 200 and can drive the support member 51 to extend out of the preset opening 18 to support the external electronic device 200, such that a certain angle between the external electronic device 200 and the corresponding surface is formed, to facilitate the user to detach and take off the external electronic device 200, as shown in FIG. 16F.

Further, in order to prevent the second connection plug 22 from bending relative to the second connection portion 24 due to the upward support of the device flipping structure 5 to the external electronic device 200, the device flipping structure 5 may be disposed at a preset position around the second fastening portion 32. There may be provided a plurality of device flipping structures 5 to help the external electronic device 200 keep balanced during the flipping process and avoid tilting.

Here, the device flipping structure 5 may include a pop-up structure used to realize the pop-up of the external electronic device 200. After the external electronic device 200 is mounted on the second fastening portion 32, the device flipping structure 5 may be covered by the external electronic device 200 as illustrated in FIGS. 16C-16F. Generally, the second fastening portion 32 is fixed at half the length of the vertical direction of the external electronic device 200. The vertical distance between the device flipping structure 5 and the second fastening portion 32 may be smaller than half the length of the external electronic device 200 in the vertical direction. The second fastening portion 32 may be moved in two directions: left and right, as illustrated in FIG. 12 to accommodate the different sizes of external electronic devices 200. However, in order for the external electronic device 200 having the minimum size to be popped up by the device flipping structure 5, in the lateral direction, the device flipping structure 5 is located on the left side of the second fastening portion 32 (when the second fastening portion 32 is located on the right side of the whole device). At the same time, the closer the device flipping structure 5 is to the second fastening portion 32 for torque, the easier it is for the external electronic device 200 to be popped up.

Figure 18:
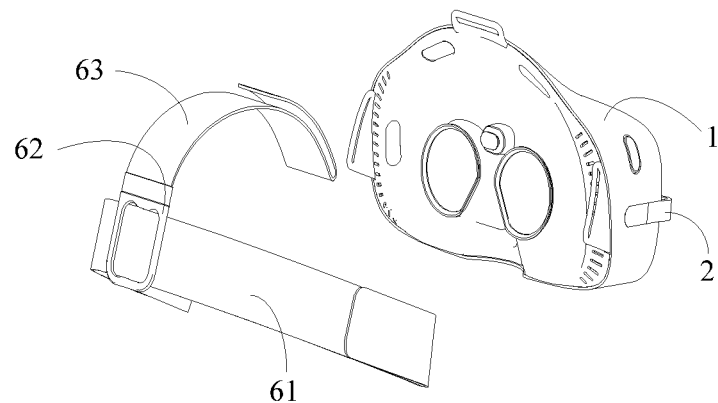
FIG. 18 is an exploded structural view of virtual reality glasses according to an aspect of the disclosure.

Based on the technical solution of the present disclosure, as shown in FIG. 18, the virtual reality glasses 100 may further include a wearing structure 6 for fixing the glasses body 1 to a user's face, and the wearing structure 6 may include a first strap 61, a connection portion 62, and a second strap 63, wherein both ends of the first strap 61 are detachably connected to the glasses body 1 to form an annular structure adapted to the user's head, and one end of the second strap 63 is detachably connected to the glasses body 1 and the other end is connected to the connection portion 62. When the virtual reality glasses 100 is worn, the first strap 61 and the second strap 63 may be in a substantially vertical state, so as to ensure the user's steady wearing of the virtual reality glasses 100.

Figure 19:
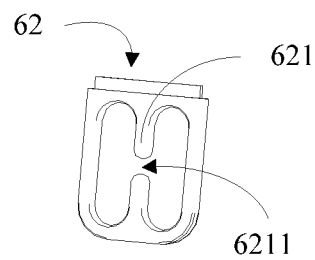
FIG. 19 is a schematic structural view of a connection portion according to an aspect of the disclosure.
Figure 20:
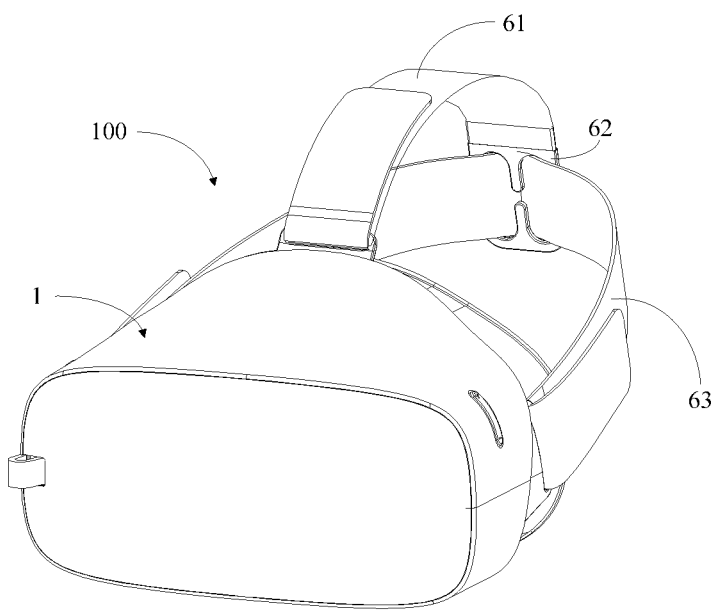
FIG. 20 is a perspective structural view of virtual reality glasses according to an aspect of the disclosure.

As shown in FIG. 19 and FIG. 20, the connection portion 62 may include a blocking member 621 having an opening 6211 provided thereon such that the first strap 61 can pass through the opening 6211 from one side of the connection portion 62, facilitating the separation between the first strap 61 and the second strap 63, so as to facilitate the user to wear the virtual reality glasses 100. Further, any one or both of the first strap 61 and the second strap 63 may be made of an elastic material, to suit different users' head size.

Figure 21:
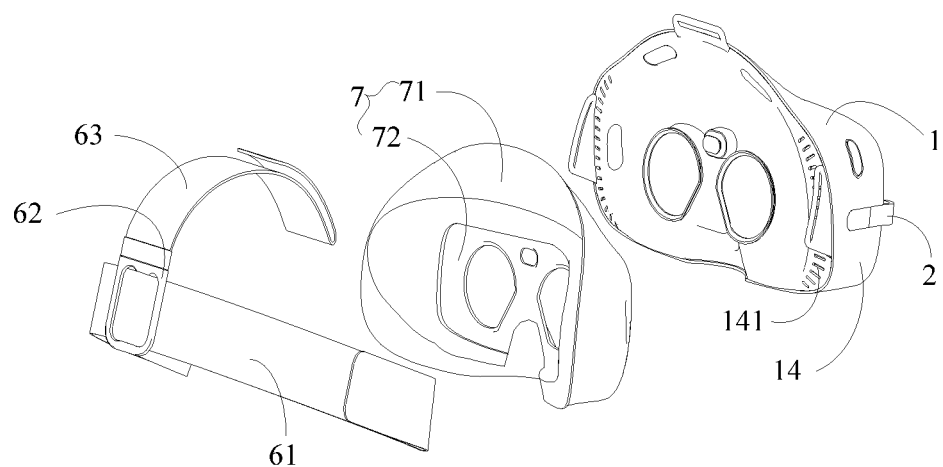
FIG. 21 is an exploded schematic structural view of another virtual reality glasses according to an aspect of the disclosure.

As shown in FIG. 21, the virtual reality glasses 100 may further include a protective structure 7. The protective structure 7 may include a bonding portion 71 adapted to the surface of the glasses body 1 facing the user's face, and an engaging portion 72 extending in the direction toward the user's face and adapted to the user's face. The protective structure 7 can be made of a material with cushioning properties to improve user comfort. The bonding portion 71 can be adhered to the corresponding surface by adhesive bonding or velcro bonding, which is not limited in the present disclosure.

The housing 14 may include a vent hole 141 for communicating the interior space of the housing 14 with the exterior of the housing 14 to dissipate the heat of the virtual reality glasses 100.

The data connection line can be detachably connected to the glasses body of the virtual reality glasses. Thus, the user can change the data connection line to correspond to the interface type of an external electronic device, improving the versatility of virtual reality glasses.

Other embodiments of the present disclosure will readily occur to those of skill in the art upon consideration of the specification and practice of the disclosure disclosed herein. This application is intended to cover any variations, uses, or adaptations of the disclosure that follow the general principles of the disclosure and include common general knowledge or conventional technical means in the art, which are not disclosed in this disclosure. The specification and embodiments are considered to be exemplary only, with the true scope and spirit of the disclosure being indicated by the following claims.

It should be understood that the present disclosure is not limited to the precise structures that have been described above and shown in the drawings, and that various modifications and changes may be made without departing from the scope thereof. The scope of the disclosure is limited only by the accompanying claims.

What is claimed is:

1. Virtual reality glasses, comprising:
    a glasses body configured to be assembled with an external electronic device that plays virtual reality content, and wherein the glasses body comprises
        a housing having a first surface and a second surface; wherein the first surface of the housing faces a user's face, and the second surface of the housing is configured to assemble the external electronic device; and wherein the first interface being located at a sidewall of the housing;
    a data connection line configured to be connected with the glasses body in a detachable connection, the data connection line comprising
        a first connection plug at a first end, the first connection plug configured to be engaged with a first interface on the glasses body in the detachable connection; and
        a second connection plug at a second end, the second connection plug being adapted to a second interface of the external electronic device; and
    wherein the housing further comprises a first groove, and the first interface is located within the first groove;
    wherein the data connection line comprises a first connection portion at the first end, a second connection portion at the second end, and a data line body located between the first end and the second end; and the first groove can receive the first connection portion and at least a portion of the data line body; and
    wherein the data connection line further comprises an injection molded member, the injection molded member enclosing at least the first connection portion and at least a portion of the data line body, and the injection molded member is adapted to the first groove.

2. The virtual reality glasses according to claim 1, wherein the housing comprises a vent hole that connects an interior space defined by a first surface side of the housing with an exterior formed by a second surface side of the housing.

3. The virtual reality glasses according to claim 1, wherein the glasses body further comprises:
    a protective structure, the protective structure comprising a bonding portion adapted to the first surface and an engaging portion formed by extending in a direction toward the user's face and adapted to the user's face.

4. The virtual reality glasses according to claim 3, wherein the protective structure is made of a material with cushioning properties.

5. The virtual reality glasses according to claim 1, wherein the data connection line is made of an elastic material so as to adapt to a separation distance between the first interface and the second interface.

6. The virtual reality glasses according to claim 1,
    wherein when the first connection plug is perpendicular to a connection direction of the first end and the second end, the first interface is located at the bottom of the first groove such that the first connection plug is connected to the glasses body in a direction perpendicular to the surface of the housing;
    wherein when the first connection plug is parallel to the connection direction of the first end and the second end, the first interface is located on a sidewall of the first groove such that the first connection plug is connected to the glasses body in a direction parallel to the surface of the housing.

7. The virtual reality glasses according to claim 1, wherein when the data connection line is connected to the glasses body, the surfaces of the first connection portion and at least a portion of the data line body are respectively aligned with the housing surface of the glasses body.

8. The virtual reality glasses according to claim 1, further comprising:
    a fastening structure configured to fasten the external electronic device to the glasses body;
    the fastening structure comprising a first fastening portion, a second fastening portion and a transmission portion, both ends of the transmission portion being respectively engaged with the first fastening portion and the second fastening portion, such that when either of the first fastening portion and the second fastening portion moves toward a preset direction, the transmission portion can drive the other to move in a direction opposite to the preset direction in a linked way.

9. The virtual reality glasses according to claim 8, wherein the first fastening portion and the second fastening portion respectively include racks, which are respectively engaged with gears on the two ends of the transmission portion, such that the first fastening portion and the second fastening portion are configured to move in a linked way.

10. The virtual reality glasses according to claim 8, wherein the transmission portion comprises:
a first transmission member being engaged with the first fastening portion;
a second transmission member being engaged with the second fastening portion; and
a third transmission member being engaged with the first transmission member and the second transmission member for moving the first transmission member and the second transmission member in a linked way such that the first fastening portion and the second fastening portion can move in a linked way.

11. The virtual reality glasses according to claim 10, wherein the third transmission member comprises: a first transmission shaft and a second transmission shaft respectively engaged with the first transmission member and the second transmission member, and an engaging member engaged with the first transmission shaft and the second transmission shaft; wherein the first transmission shaft and the second transmission shaft rotate in opposite directions.

12. The virtual reality glasses according to claim 11, wherein the engaging member comprises at least one of:
at least one group of bevel gear sets and motors engaged with each other.

13. The virtual reality glasses according to claim 8, wherein the second end of the data connection line is detachably connected to the first fastening portion; and
wherein a distance between the first fastening portion and the first end of the data connection line is less than the distance between the second fastening portion and the first end of the data connection line.

14. The virtual reality glasses according to claim 8, wherein the first fastening portion may rotate the second connection plug between a preset maximum inclined opening angle and a horizontal fastening angle;
wherein the first fastening portion can fasten the end of the external electronic device having the second interface at the horizontal fastening angle; and
the second fastening portion can fasten the end of the external electronic device relative to the second interface.

15. The virtual reality glasses according to claim 14, wherein the first fastening portion comprises:
a first fastening seat, which can fasten one end of the external electronic device at the horizontal fastening angle; and
a first movable plate, which is hinged with the first fastening seat such that the first fastening seat rotates between a maximum inclined opening angle and a horizontal fastening angle, and which is slidable relative to a first slideway on the glasses body such that the first fastening seat reciprocates on the glasses body.

16. The virtual reality glasses according to claim 8, wherein the data connection line comprises a first connection portion located at the first end, a second connection portion located at the second end, and a data line body located between the first end and the second end; the first fastening portion comprises a receiving space for receiving the second connection portion such that the second connection portion of the data connection line is connected to the first fastening portion.

17. The virtual reality glasses according to claim 16, wherein one of the following conditions is met:
the second connection portion and the receiving space are connected via an interference fit such that the second connection portion and the first fastening portion are tightly assembled; and
the receiving space comprises a protruding block located on a sidewall forming the receiving space, and the second connection portion comprises a second groove adapted to the protruding block, such that the second connection portion and the first fastening portion are tightly assembled through the engagement between the protruding block and the second groove.

18. The virtual reality glasses according to claim 16, wherein the receiving space is formed by the surface of the first fastening portion being depressed away from the glasses body in a direction toward the interior of the glasses body.

19. The virtual reality glasses according to claim 18, further comprising a cover, a side of the cover close to the glasses body is configured to abut against the surface of the second connection portion of the data connection line assembled to the receiving space.

20. The virtual reality glasses according to claim 8, wherein the second fastening portion comprises an abutting member abutting against a corresponding end face of the external electronic device, and the abutting member comprises a plurality of protrusions disposed relative to the external electronic device to increase the frictional force between the external electronic device and the second fastening portion.

21. The virtual reality glasses according to claim 20, wherein the abutting member is made of at least one of the following materials:
rubber and plastic foaming material made of ethylene-vinyl acetate copolymer, silicon rubber, and ethylene-vinyl acetate copolymer.

22. The virtual reality glasses according to claim 8, further comprising:
a device flipping structure, comprising a support member located in a preset opening and an elastic member disposed at the bottom of the support member, the preset opening being located on the surface of the glasses body relative to the external electronic device;
wherein when fastened to the glasses body, the external electronic device presses the support member such that the elastic member is deformed and at least a portion of the support member is retracted into the preset opening; and when the fastening structure releases the fastening of the external electronic device, the elastic member is configured to drive the support member to protrude out of the preset opening so as to support the external electronic device.

23. The virtual reality glasses according to claim 22, wherein the device flipping structure is disposed at a preset position around the second fastening portion.

24. The virtual reality glasses according to claim 1, further comprising a wearing structure configured to fix the glasses body to a user's head, the wearing structure comprising:
a first strap, both ends of the first strap being respectively detachably connected to the glasses body to form an annular structure adapted to the user's head;
a connection portion, the connection portion comprising a blocking member on which an opening is provided through which the first strap can pass from one side of the connection portion to the other so as to be limited by the blocking member;

a second strap, one end of the second strap being detachably connected to the glasses body, and the other end of the second strap being connected to the connection portion.

25. The virtual reality glasses according to claim 24, wherein at least one of the first strap and the second strap is made of an elastic material.

* * * * *